United States Patent

[11] 3,579,184

| [72] | Inventor | Robert J. Forestal<br>Indianapolis, Ind. |
|---|---|---|
| [21] | Appl. No. | 815,301 |
| [22] | Filed | Apr. 11, 1969 |
| [45] | Patented | May 18, 1971 |
| [73] | Assignee | Dura Corporation<br>Southfield, Mich. |

[54] PORTABLE EXTENDABLE SIGNAL LIGHT PLATFORM
12 Claims, 3 Drawing Figs.

[52] U.S. Cl. .................................................. 340/137, 340/87, 340/88
[51] Int. Cl. .................................................. G08b 5/36, G08b 3/00
[50] Field of Search ........................................... 340/137, 87, 88

[56] References Cited
UNITED STATES PATENTS

| 2,119,626 | 6/1938 | Hollaway..................... | 340/137 |
| 2,738,492 | 3/1956 | Arneson...................... | 340/87 |
| 2,843,836 | 7/1958 | McDonald.................... | 340/87 |
| 3,128,448 | 4/1964 | Shumer....................... | 340/87 |
| 3,271,735 | 9/1966 | Gosswiller................... | 340/87X |

*Primary Examiner*—Harold I. Pitts
*Attorney*—Trask, Jenkins & Hanley

ABSTRACT: A platform for carrying emergency signals having a lazy-tong structure attached to its underside. Said structure is actuable by an electric motor to raise and lower the platform to and from an extended position. The platform serves as a cover for a cabinet which houses the motor and the retracted lazy-tong structre, said cabinet being mountable on the roof of an emergency vehicle.

INVENTOR.
ROBERT J. FORESTAL

PORTABLE EXTENDABLE SIGNAL LIGHT PLATFORM

BACKGROUND OF THE INVENTION

Most emergency vehicles such as tow trucks and police cars have flashing lights and sirens mounted on their roofs to warn oncoming motorists of emergency conditions. Such lights are of limited value since their height above the ground is normally the same as the height of the vehicle so that the lights can not be seen from great distances. Furthermore, any floodlights mounted on such vehicles for illuminating the emergency area are also of limited utility due to their low elevation, since they must be directed in a substantially horizontal plane and thereby have a blinding effect when one looks in the direction of the vehicle. Therefore, it is an object of this invention to provide an extendable platform for carrying emergency lights and other equipment, which platform is automatically operable to move between its lowered and elevated positions.

SUMMARY OF THE INVENTION

In accordance with the invention, my platform forms the cover of a cabinet mounted on the roof of an emergency vehicle. The platform carries emergency lighting equipment, and is extendable to a position high above the roof of the vehicle by a lazy-tong structure housed within said cabinet. The lazy-tong structure is formed by four pairs of arms each pair pivotally connected at their center points. The pairs of arms are arranged in two sets, one above the other, each set being formed by two of the pairs of arms interconnected at their center points in a parallel spaced relation. The upper and lower ends of one set of arms are pivotally connected respectively to slides on the underside of the platform, and to the upper ends of the other set of arms; while the lower ends of the lazy-tong arms of said other set are pivotally connected to slides in the cabinet. As the slides in the cabinet are drawn together, thereby drawing the lowermost ends of the lazy-tong arms together, the ends of the arms connected to the platform arms are also pulled together, and the resultant action of the lazy-tong structure raises the platform with respect to the roof of the vehicle to a height which is approximately equal to twice the length of one of the lazy-tong arms.

The two sets of slides are carried in pairs of guides mounted on the platform and cabinet. Each pair of slides carried in the cabinet guides is interconnected by a plate having mounted thereon a follower block provided with a threaded hole extending therethrough. A threaded shaft connected to a reversible drive mechanism is rotatably received in said follower blocks. Thus, rotation of said shaft in one direction draws the blocks, and thus the slides inwardly toward each other to raise the platform, while rotation of said shaft in an opposite direction forces said blocks, and urging the slides away from each other to lower the platform. Conveniently, a limit switch is mounted in the cabinet to deactivate said drive mechanism as the platform reaches its upper and lower extremes.

BRIEF DESCRIPTION OF THE DRAWINGS

The accompanying drawings illustrate the invention. In such drawings.

DETAILED DESCRIPTION OF THE PREFERRED EMBODIMENT

Figure 1:
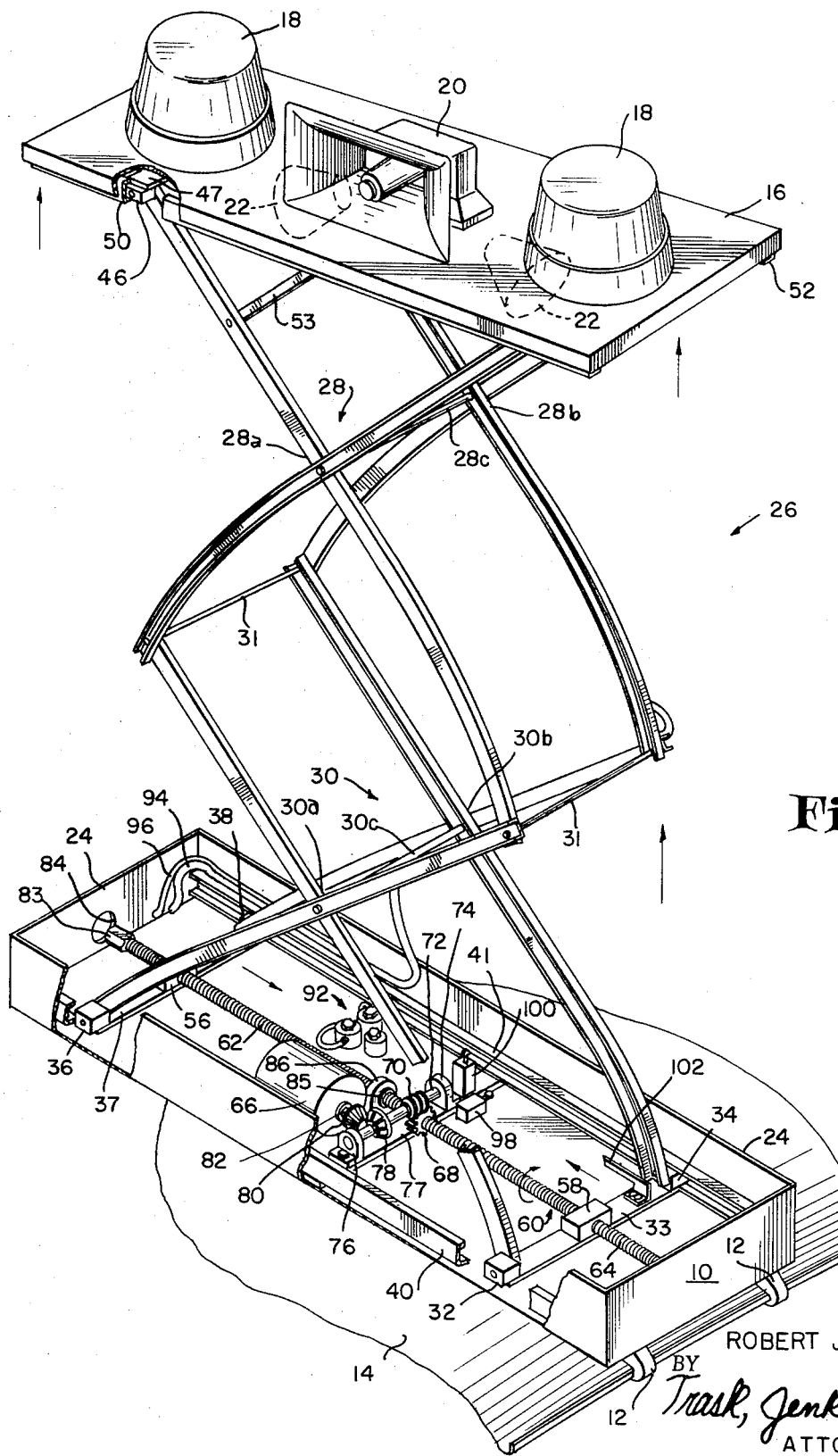
FIG. 1 is an isometric view with portions thereof being broken away and showing one embodiment of my invention with the platform in a partially extended position.

As shown in the drawings, one embodiment of my invention comprises an upwardly open cabinet 10 having hooks 12 attached thereto for fastening said cabinet across the roof 14 of an emergency vehicle. The cabinet is rectangular in shape having a width of about 2 feet and a length about equal to the width of the vehicle roof 14. A platform 16 forms a cover for the cabinet and carries emergency warning equipment such as flashing lights 18, a siren 20 and floodlights 22. The platform 16 rests on the upper edges of the cabinet and seals said cabinet, and the structure therein, against rain or contaminants.

Housed within the cabinet is an extendable lazy-tong structure 26 interconnecting the underside of the platform and the lower portion of the cabinet for raising and lowering the platform with respect to the vehicle roof. The lazy-tong structure 26 comprises two sets of arms 28 and 30, each set having two pairs of scissors-connected arms 28a and 28b, and 30a and 30b. As shown, arms 28a and 28b are spaced apart and pivotally interconnected intermediate their lengths by a pivot rod 28c, and in a like manner, arms 30a and 30b are interconnected intermediate their lengths by a pivot rod 30c. Thus, each set of the arms 28 and 30 can be manipulated in a scissors fashion.

The arm sets 28 and 30 are arranged one on top of the other with the lower ends of the upper arms 28 pivotally connected, as by rods 31, to the upper ends of the lower arms 30. The lower arms 30 are pivotally connected respectively to four slide blocks 32, 34, 36 and 38. As shown, blocks 32 and 34, which are disposed adjacent one end of the cabinet, are interconnected by a transverse plate 33 and are connected to the lower ends of one pair of arms 30. The blocks 36 and 38, which are disposed adjacent the opposite end of the cabinet, are interconnected by a transverse plate 37 and are connected to the lower ends of the other pair of arms 30. The blocks 32, 34, 36 and 38 are slidably interconnected in channel-shaped guides 40 and 41 extending longitudinally along the opposed sides of the cabinet. Thus, the blocks and guides permit a guided sliding movement of the lower ends of the arms 30 toward and away from each other.

In the same manner as the lower ends of the arms 30, the upper ends of the pairs of arms 28a and 28b are also pivotally connected to a set of four slide blocks 42 and 46, and 44 and 48; blocks 42 and 44 being interconnected by a transverse plate 43, and blocks 46 and 48 being interconnected by a transverse plate 47. Opposed channelled guides 50 and 52 extend longitudinally along the opposed sides of the lower face of the platform to slidably receive the slide blocks 42 and 46, 44 and 48. As shown, a pair of braces 53 and 54 are pivotally connected at their ends to the platform 16 and a pair of the arms 28a and 28b to retain the platform in its centered position with respect to the scissoring arm structure.

Figure 3:
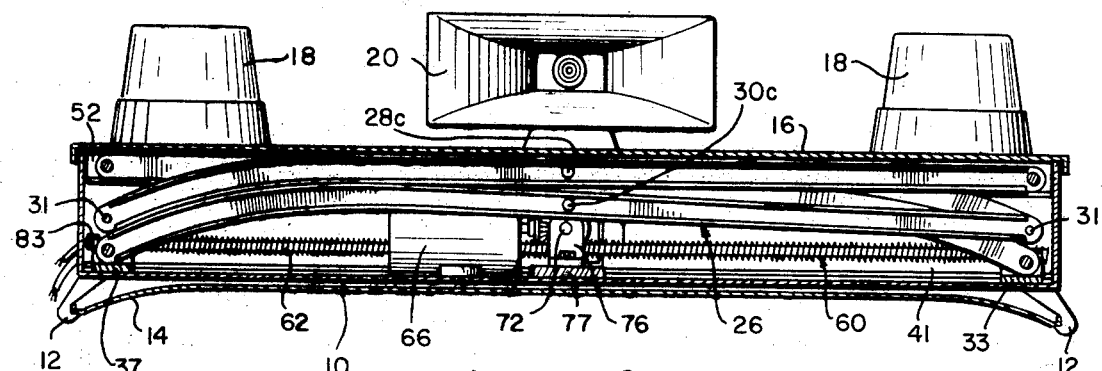
FIG. 3 is a front elevation of the embodiment shown in FIG. 1, but with the lazy-tong structure retracted and with the forward wall of the cabinet removed.
Figure 2:
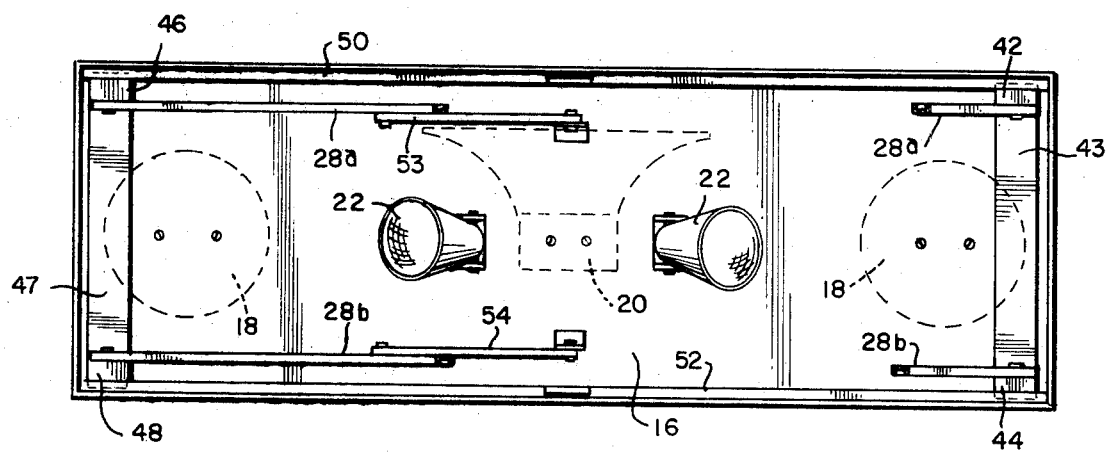
FIG. 2 is a plan view of the underside of the platform shown in FIG. 1.

When the plates 33 and 37 are moved into their fully spread position as shown in FIG. 3, the scissored arms 30a and 30b are in their fully closed condition, whereby their upper ends hold the scissored arms 28a and 28b in their fully closed position with the plates 43 and 47 disposed in their fully spread position adjacent the ends of the platform. In this position, the lazy-tong structure is completely collapsed and housed within the cabinet with the platform closing the top of said cabinet. As the plates 33 and 37 are drawn together, and the lower ends of the arms 28 are also forced toward each other so that both sets extend out of the cabinet, thereby elevating the platform. As shown, the lower end of each of the arms of the lazy-tong structure 26 is curved downwardly to provide a slight clearance of said structure 26 from the bottom of the cabinet when it is retracted, and to provide a slight mechanical advantage at the start of opening and closing movements of said structure 26.

An automatic drive system is mounted within the cabinet for operating the lazy-tong structure 26. Said system includes a pair of follower blocks 56 and 58 mounted centrally on each of the plates 33 and 37. Each follower block 56 and 58 has a threaded longitudinal hole extending therethrough in which the threaded ends of a rotatable shaft 60 are carried. The threads 62 at one end of the shaft 60, which cooperate with the threads of the block 56, are oppositely turned from the threads 64 at the other end of the shaft 60, which cooperate with the threads of the block 58. Thus, as the shaft is rotated the blocks 56 and 58 are simultaneously drawn toward each other, or extended away from each other, to thereby move the lower set of arms 30 in a scissors fashion. The shaft 60 is rotated by a plurality of gears driven by an electric motor 66 connected to a suitable power source. A worm wheel 68 is mounted near the center of said shaft 60 and driven by a worm 70 mounted on a transverse shaft 72 supported in a pair of bearing blocks 74 and 76. Said bearing blocks are mounted on a cross bar 77 disposed on the floor of the cabinet and connected to the channelled guides 40 and 41. A bevel gear 78 on shaft 72 is in mesh with a bevel gear 80 mounted on the drive shaft 82 of the motor 66. Therefore, as the motor is driven in one direction, the gear arrangement causes the shaft 60 to rotate in one direction and to raise the platform, and when the direction of rotation of the motor 66 is reversed, the direction of rotation of the shaft 60 is reversed, and the platform 16 is lowered. A hex head nut 83 is provided at one end of the shaft 60 in alignment with an opening 84 in the adjacent cabinet end wall. Thus, if for some reason the motor 66 is inoperable, the nut 83 may be engaged by a wrench to manually crank the shaft 60.

The threaded shaft 60 is held in a fixed position within the cabinet by a thrust bearing 85 mounted on a block 86 and having the shaft journaled therein. Therefore, the slide blocks 32, 34, 36 and 38 can not float freely in channel guides 40 and 41, but rather, the interconnected pairs of blocks 32, 34, 36 and 38 are always spaced equally from the center of the cabinet.

A plurality of solenoid switches 92 are mounted within the cabinet and are controlled by switches within the vehicle. In the embodiment shown, the switching contacts of the solenoids carry the motor current, and therefore heavy wire 94 is connected directly from the vehicle's engine compartment to the cabinet 10 and switched within the cabinet to drive the motor in one direction or the other. Thus, the heavy wire 94 is not connected through switches on the dashboard of the vehicle since the switching takes place in the solenoids 92. Current for operating the solenoids 92 and the lights 18 and 22 is carried from the driver's seat (not shown) to the cabinet by cables 96 which branch off within the cabinet for connection to the solenoids and for routing along the lazy-tong structure to said lights. A pair of limit switches 98 and 100 are also mounted within the cabinet and are actuated to deenergize the motor when the platform reaches either its upper or lower extreme of movement. The limit switch 98 which stops motor operation when the platform reaches its upper extreme is actuated by a cam 102 mounted on the slide plate 33, and limit switch 100 is actuated by contact with the descending platform 16.

In the operation of the device when it is desired to raise the platform to warn oncoming motorists, switches are thrown within the vehicle to light the emergency lights and to energize the motor to drive the platform upward. If the joints in the lazy-tong structure 26 are frozen, the floodlights 22 may be turned on to thaw out the structure and thus permit its operation. When the platform is in its upper extended position, it may be at a height more than twice the height of the vehicle depending on the length of the lazy-tong arms, which in turn may be about as wide as the vehicle itself. When said platform is raised, the lights can be seen from a much greater distance, and the floodlights 22 can be turned on to illuminate the entire emergency area. With the floodlights elevated, they are much more effective since they cover a larger area and since they do not blind the emergency workers or oncoming motorists.

I claim:

1. A warning device for carriage on the roof of an emergency vehicle, comprising a platform having emergency signal equipment mounted thereon, a cabinet fixedly supported on the roof of said vehicle, elevating means in said cabinet for moving said platform between a retracted and an extended position, said platform in its retracted position resting on and providing a cover for the cabinet and its extended position being disposed above said cabinet in spaced relation thereto.

2. The invention as set forth in claim 1 in which said elevating means comprises a lazy-tong structure having its lower ends slidably mounted within the cabinet, and its upper ends slidably mounted on said platform, and means for moving the lower ends of said lazy-tong structure toward and away from each other to raise and lower said platform.

3. An extendable platform apparatus, comprising a cabinet, a platform, guide means on said cabinet and platform, a first set of crossed links pivotally interconnected intermediate their lengths and having their lower ends slidably interconnected to said guide means on said cabinet, a second set of crossed links pivotally interconnected intermediate their lengths and having their lower ends pivotally connected to the upper ends of said first set of links and their upper ends slidably interconnected to said guide means on said platform, a reversible drive motor, a rotatable shaft operatively interconnected to said motor for rotation thereby, and means operatively interconnected to the lower ends of said first set of links and to said shaft whereby rotation of said shaft in one direction will draw the lower ends of said first set of links toward each other for raising said platform with respect to said cabinet and rotation of said shaft in an opposite direction will move said lower ends of said first set of links away from each other to lower said platform with respect to said cabinet.

4. The invention as set forth in claim 3 in which the lower ends of said first and second sets of links are curved downwardly.

5. The invention as set forth in claim 3 with the addition that a pair of braces are pivotally connected to said second set of links and platform for retaining said platform centered with respect to the upper ends of said second set of links.

6. The invention as set forth in claim 3 in which the ends of said shaft are oppositely threaded, and said means being operatively interconnected to the lower ends of said first set of links comprises a pair of follower blocks, said blocks having threaded openings therein for the reception of the threaded ends of said shaft.

7. The invention as set forth in claim 3 with the addition that a pair of limit switches connected to said motor are mounted on said cabinet, one of said switches being engageable with said platform as the lower ends of said first set of links are moved away from each other and the other one of said switches being engageable with means at the lower ends of said first set of links as said lower ends are moved toward each other.

8. The invention as set forth in claim 3 in which each set of links comprises two pairs of laterally spaced crossed links, a first pair of plates interconnecting the lower ends of the pairs of links in said first set of links, a second pair of plates interconnecting the upper ends of the pairs of links in said second set of links, a slide pivotally mounted on the lower end of each link in said first set and slidably received in the guide means on the cabinet, and a slide pivotally mounted on the upper end of each link in said second set and slidably received in the guide means on said platform.

9. An extendable platform apparatus, comprising a cabinet, a platform, a first pair of guides in said cabinet, a second set of guides on said platform a first set of links comprising two pairs of crossed links, a first pair of plates interconnecting the lower ends of each pair of links, slides pivotally mounted on the lower ends of the links in said first set and slidably carried in said first set of guides a second set of links comprising two pairs of crossed links pivotally connected at their lower ends to said first set of links, a second pair of plates interconnecting the upper ends of each pair of links in said second set, slides pivotally mounted on the upper ends of the links in said second set and slidably carried in said second set of guides, a threaded follower block mounted on each of said first pair of plates, a rotatable shaft supported in said first pair of plates, a rotatable shaft supported in said cabinet and having oppositely threaded ends received in said follower blocks whereby rotation of said shaft in one direction will cause said first and second set of links to move said platform outwardly from said cabinet and rotation of said shaft in an opposite direction will cause said links to move said platform toward said cabinet, reversible drive means for rotating said shaft, and a pair of braces pivotally connected to said platform and second set of links.

10. The invention as set forth in claim 9 with the addition that a pair of limit switches are connected to said drive means, one of said switches being engageable with said platform as it is moved toward said cabinet to deenergize said drive means and the other of said switches being engageable with means on one of said first pair of plates to deenergize said drive means as said platform is moved outwardly from said cabinet.

11. A warning device, comprising a platform having emergency signal equipment mounted thereon, a cabinet having an open upper end, a plurality of pairs of crossed links with the links in each pair being pivotally joined together intermediate their lengths and each pair of said links being pivotally joined at their ends to the next adjacent pair of links, the lower end of each of said links being curved downwardly with respect to the upper end thereof, the upper ends of the uppermost pair of said links being slidably interconnected to said platform and the lower ends of the lowermost pair of said links being slidably interconnected to said cabinet, means in said cabinet for moving the lower ends of said lowermost pair of links toward and away from each other to cause said plurality of links to raise and lower said platform, said platform in lowered position resting on and providing a cover for said cabinet.

12. A warning device as set forth in claim 11 with the addition that said platform and cabinet have guide means for guiding the movements of the link ends slidably interconnected thereto.

PO-1050
(5/69)

UNITED STATES PATENT OFFICE
CERTIFICATE OF CORRECTION

Patent No. 3,579,184　　　　　　　　　Dated　May 18, 1971

Inventor(s)　ROBERT J. FORESTAL

It is certified that error appears in the above-identified patent and that said Letters Patent are hereby corrected as shown below:

In the Abstract:

Line 6, "Structre" should be --structure--.

Col. 2, line 61 after "ends" insert --of the scissored arms 30 are moved toward each other, the lower ends--.

Col. 4, lines 73-74 delete "first pair of plates, a rotatable shaft supported in said".

Signed and sealed this 19th day of October 1971.

(SEAL)
Attest:

EDWARD M. FLETCHER, JR.
Attesting Officer

ROBERT GOTTSCHALK
Acting Commissioner of Patents